United States Patent
Rolando et al.

(10) Patent No.: US 8,641,564 B2
(45) Date of Patent: Feb. 4, 2014

(54) PULLEY TENSIONER FOR AN OIL WET BELT DRIVE

(75) Inventors: Adriano Rolando, Valperga Canavese (IT); Federico Domenico Licata, Turin (IT); Gianluca Pane, Ivrea (IT)

(73) Assignee: Dayco Europe S.r.l., Chieti (IT)

(*) Notice: Subject to any disclaimer, the term of this patent is extended or adjusted under 35 U.S.C. 154(b) by 898 days.

(21) Appl. No.: 12/451,884

(22) PCT Filed: Jun. 5, 2007

(86) PCT No.: PCT/IT2007/000395
§ 371 (c)(1),
(2), (4) Date: Mar. 26, 2010

(87) PCT Pub. No.: WO2008/149390
PCT Pub. Date: Dec. 11, 2008

(65) Prior Publication Data
US 2010/0190594 A1   Jul. 29, 2010

(51) Int. Cl.
*F16H 7/20* (2006.01)

(52) U.S. Cl.
USPC .......................................................... 474/112

(58) Field of Classification Search
USPC ............... 474/101, 112, 113, 133, 134, 135
See application file for complete search history.

(56) References Cited

U.S. PATENT DOCUMENTS

| | | | |
|---|---|---|---|
| 3,934,947 A | 1/1976 | Walter et al. | |
| 4,634,407 A * | 1/1987 | Holtz | 474/112 |
| 4,689,037 A | 8/1987 | Bytzek | |
| 4,721,495 A | 1/1988 | Kan et al. | |
| 5,558,587 A | 9/1996 | Church | |
| 5,620,385 A | 4/1997 | Cascionale et al. | |
| 5,759,125 A | 6/1998 | Berg | |
| 5,993,340 A | 11/1999 | Rocca et al. | |
| 6,761,483 B1 | 7/2004 | Michiels | |
| 6,857,979 B2 | 2/2005 | Macnaughton et al. | |
| 7,165,521 B2 | 1/2007 | Nakajima | |
| 7,217,207 B1 * | 5/2007 | Hallen | 474/135 |
| 7,273,432 B2 | 9/2007 | Schonmeier et al. | |
| 7,611,431 B2 * | 11/2009 | Dinca et al. | 474/112 |

(Continued)

FOREIGN PATENT DOCUMENTS

| | | |
|---|---|---|
| DE | 4313058 | 10/1993 |
| DE | 19614546 | 10/1996 |

(Continued)

OTHER PUBLICATIONS

International Search Report and Written Opinion mailed Nov. 7, 2007 in PCT Appln. No. PCT/IT2007/000228.

(Continued)

*Primary Examiner* — William E Dondero
*Assistant Examiner* — Robert T Reese
(74) *Attorney, Agent, or Firm* — Davidson Berquist Jackson & Gowdey, LLP

(57) ABSTRACT

A tensioner (1) for a belt drive, comprises a base (2) defining an axis (A), a mobile eccentric element (3) hinged about axis (A) and loaded by a spring (5), a pulley (4) idly connected to the mobile element (3). Specifically, the pulley (4) defines a single body with the external ring of a rolling bearing (6) mounted on the mobile element (3) and the spring (5) is helical and presents a square or rectangular cross section.

12 Claims, 1 Drawing Sheet

(56) References Cited

U.S. PATENT DOCUMENTS

| | | |
|---|---|---|
| 7,637,829 B2 | 12/2009 | Stone et al. |
| 7,874,950 B2 | 1/2011 | Lehtovaara et al. |
| 7,980,976 B2 | 7/2011 | Stepniak et al. |
| 7,985,151 B2 | 7/2011 | Singer |
| 2003/0083164 A1 | 5/2003 | MacNaughton et al. |
| 2004/0180745 A1* | 9/2004 | Dinca et al. ............ 474/135 |
| 2006/0068957 A1 | 3/2006 | Stone et al. |
| 2008/0025658 A1 | 1/2008 | Hochmayr et al. |
| 2008/0153642 A1 | 6/2008 | Baumuller et al. |
| 2008/0287233 A1* | 11/2008 | Cantatore ............... 474/112 |
| 2010/0190594 A1 | 7/2010 | Rolando et al. |
| 2010/0190595 A1 | 7/2010 | Baumuller et al. |
| 2011/0045929 A1 | 2/2011 | Rolando et al. |
| 2011/0218066 A1* | 9/2011 | Rolando et al. ........ 474/113 |

FOREIGN PATENT DOCUMENTS

| | | |
|---|---|---|
| DE | 10021587 | 11/2001 |
| EP | 0709595 | 5/1996 |
| EP | 1746306 | 1/2007 |
| GB | 2233063 | 1/1991 |
| JP | 2004-150552 | 5/2004 |
| WO | WO 99/28652 | 6/1999 |
| WO | WO 2005/038297 | 4/2005 |
| WO | WO 2005/080820 | 9/2005 |
| WO | WO 2006/111988 | 10/2006 |
| WO | WO 2008/068782 | 6/2008 |
| WO | WO 2008/117319 | 10/2008 |
| WO | WO 2008/149390 | 12/2008 |

OTHER PUBLICATIONS

International Search Report and Written Opinion mailed Oct. 23, 2007 in application PCT/IT2006/000836.

International Search Report mailed Nov. 9, 2007 in PCT Appln. No. PCT/IT2007/000394.

U.S. Appl. No. 12/312,978—Oct. 17, 2011 PTO Office Action.

U.S. Appl. No. 12/451,883—Dec. 22, 2011 PTO Office Action.

* cited by examiner

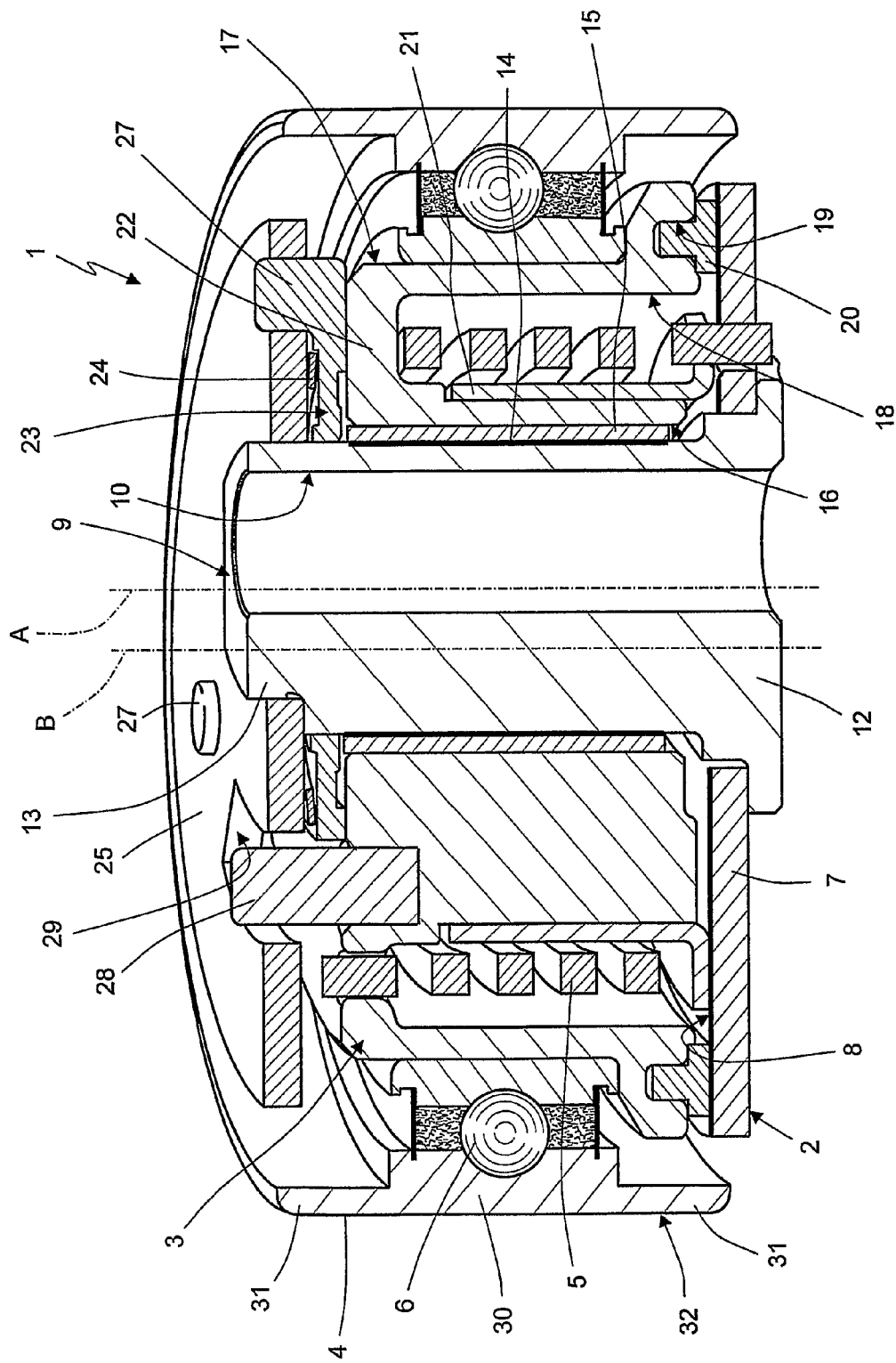

PULLEY TENSIONER FOR AN OIL WET BELT DRIVE

TECHNICAL FIELD

The present invention relates to a pulley tensioner for an oil wet belt drive, for example for a timing drive of an internal combustion engine.

BACKGROUND ART

Timing drives generally comprise either an oil-lubricated chain mounted in a compartment connected to the engine oil circuit or a dry-running toothed belt. A timing drive has recently been manufactured wherein either the belt is at least partially dipped in oil at rest, or the oil is conveyed on the belt, e.g. by spraying by means of a specific nozzle or by whipping due to the action of the belt and of the pulleys.

An oil wet belt drive is lighter and causes less vibrations than a chain drive. Furthermore, the belt of an oil wet belt drive requires a lower operating tension than a chain and experimental tests have demonstrated that such drive allows to considerably reduce fuel consumptions and carbon dioxide emissions with respect to a traditional chain drive.

Such advantages may now be obtained also by upgrading or retrofitting engines originally designed for a chain drive. However, a chain drive presents different dimensions than a belt drive. Therefore, in order to upgrade a chain drive to a belt drive, all the components of the latter must be fitted within compartments originally designed for the chain drive. Possibly, some non-substantial parts of the engine may be modified in a marginal manner.

Specifically, an oil wet belt chain may be tensioned by means of an automatic pulley tensioner and this allows to further reduce the loss by friction with respect to chain drives, in which a sliding shoe is used.

However, a compartment designed for accommodating a chain drive presents an internal space which imposes major restrictions to the dimensions of an automatic pulley tensioner both along the axial direction and along the radial direction.

International patent application WO-A1-2006111988 filed by the same applicant describes a tensioner for an oil wet drive comprising a fixed pivot, a disc mounted eccentrically on the pivot and actuated by a tensioning spring and a pulley mounted concentrically on the disc by means of a ball bearing. Furthermore, the tensioner comprises a friction damping device to allow to appropriately dampen the oscillations of the belt also in the presence of oil.

Such a tensioner is compact in an axial direction and is particularly suitable for oil wet belt drives mounted onboard engines designed for operating with such a drive.

However, in the case of upgrade of a chain drive, it is also important to reduce the radial dimension as much as possible.

Furthermore, the belt presents a further reduced width comparable with that of the chain to be mounted within the previously designed compartment. A further reduced width of the belt implies an increase in the axial compacting of the tensioner and a reduction of the extension of the support surfaces, such as for example the cylindrical surface of the pivot.

The loads, on the other hand, are unchanged or tend to increase and require the tensioner to exert a corresponding torque in a reduced space. Furthermore, the specific pressure which loads the components of the tensioners used in an oil wet belt drive requires a particular resistance of the components themselves to avoid excessive wear.

DISCLOSURE OF INVENTION

The object of the present invention is to make a pulley tensioner capable of satisfying at least in part the above-described needs.

The object of the present invention is achieved by means of a tensioner as disclosed herein.

BRIEF DESCRIPTION OF THE DRAWING

For a better understanding of the present invention, a preferred embodiment will now be described by way of mere non-limitative example, with reference to the accompanying drawing, which shows an axial section of an automatic tensioner according to the present invention.

BEST MODE FOR CARRYING OUT THE INVENTION

With reference to the FIGURE, numeral 1 indicates as a whole a pulley tensioner for an oil wet belt drive comprising a base 2 adapted to be fixed to a wall of an internal combustion engine (not shown), an eccentric arm 3 hinged to base 2 about an axis A and having an axis B distanced from axis A and an idle pulley 4 mounted on eccentric arm 3.

Preferably, idle pulley 4 cooperates with the back of a timing drive belt (not shown) of the internal combustion engine.

Furthermore, tensioner 1 comprises a torsion spring 5 for loading eccentric arm 3 and a sealed bearing 6 containing a lubricating agent and having an external ring shaped so as to define an idle pulley 4 as described in greater detail below.

Specifically, base 2 comprises a flat metal plate 7 defining a flat surface 8 perpendicular to axis A and a pivot 9 rigidly connected to flat plate 7 and defining axis A.

Pivot 9 defines an axial through hole 10 for housing a fastening screw (not shown) adapted to fix tensioner 1 to the wall of the internal combustion engine.

Pivot 9 further comprises an end portion 12 rigidly connected to flat plate 7 and an end portion 13 opposite to end portion 12.

Between end portions 12 and 13, pivot 9 integrally comprises a radial support portion having a hardened layer 14 which guides the rotation of eccentric arm 3 by means of a bushing 15.

Conveniently, flat surface 8 and layer 14 are hardened so that the hardness of the surface is higher than 600 on Vickers scale. The hardening may be obtained by means of an induction tempering, a chrome-plating or a nickel-plating.

Eccentric arm 3 defines a through hole 16 for accommodating pivot 9 and a cylindrical side surface 17 coaxial to axis B.

Conveniently, bearing 6 is driven onto cylindrical side surface 17 and eccentric arm is made of steel as bearing 6 so as to essentially present the same thermal expansion coefficient as the latter.

Eccentric arm 3 further defines an annular cavity 18 open towards flat plate 7 and a circular groove 19 facing towards flat plate 7 and having a diameter larger than that of annular groove 18.

Specifically, annular groove 18 houses torsion spring 5 and circular groove 19 houses a friction ring 20 preferably formed by polyamide 4.6 cooperating in contact with flat surface 8.

Furthermore, annular groove 18 houses a protection bushing 21 radially inside torsion spring 5 to prevent a contact between the turns of torsion spring 5 and eccentric arm 3 when torsion spring 5 is loaded.

On axially opposite side with respect to friction ring 20, annular cavity 18 is closed by means of a head wall 22 of eccentric arm 3 which cooperates with a further friction device of tensioner 1.

Specifically, such friction device comprises a disc 23 arranged in contact with head wall 22, a washer spring 24 for loading or friction disc 23 onto head wall 22 and a covering plate 25 cooperating with washer spring 24 and locked on pivot 9 by means of plastic deformation machining.

Specifically, covering plate 25 defines a plurality of circular seats and, correspondingly, disc comprises a plurality of radially peripheral projections 27 sliding in the corresponding circular seats.

In this manner, disc 23 and washer spring 24 are fixed in rotation with respect to covering plate 25 and the fiction action is exerted only on the face of disc 23 in contact with head wall 22.

Furthermore, eccentric arm 3 defines on head wall 22 a seat for accommodating a pin 28 parallel to axis A and sliding in a slot 29 defined by covering plate 25. Slot 29 circumferentially delimits two stop positions of pin 28 so as to limit the maximum rotation of eccentric arm 3 with respect to base 2. Pin 28 is radially external to disc 23 and protrudingly extends with respect to head wall 22 by a distance sufficient to cooperate in a circumferential direction with covering plate 25 to define the two maximum angular positions of eccentric arm 3 in a direction of rotation and in the opposite direction.

In use, the tangential loads applied to closing plate 25 by disc 23 and pin 28, if one of the maximum angular positions of eccentric arm 3 is reached, are transmitted to pivot 9 by means of closing plate 25.

In order to decrease the radial dimension of tensioner 1, pulley 4 is integral with external ring of bearing 6.

Specifically, external ring of bearing 6 comprises a central body 30 defining the external row for the rolling elements and a pair of wings 31 protruding on opposite parts with respect to the central body for defining a cylindrical surface 32 having a dimension along axis A so as to cooperate with a belt of a drive.

Furthermore, the turns of torsion spring 5 have a square or rectangular section to reduce the dimension of the spring with respect to a spring with circular section turns, the torque applied to eccentric arm 3 being equal.

The advantages that automatic tensioner 1 allows to obtain are the following.

The combination of torsion spring 5 having square or rectangular section turns with pulley 4 integrally made with the external ring of bearing 6 allows to reduce the radial dimension up to 30% and to maintain the torque applied to eccentric arm 3 unchanged. Pulley tensioner 1 may thus further be mounted within a compartment originally designed for a chain drive.

The surface of pivot 9 hardened by means of a surface treatment implies the possibility of reducing both the diameter and the height of tensioner 1. Specifically, the surface treatment allows to reduce both the diameter and the height of pivot 9 and the increase of the specific pressure due to the reduced dimension of the components does not cause an increase of wear.

Eccentric arm 3 is formed by steel as the internal ring of bearing 6, so that the drive load remains essentially constant also beyond 120°, a temperature which is normally reached by the lubricating oil in contact with tensioner 1.

Tensioner 1 comprises friction ring 20 and friction disc 23 and washer spring 24 which concurrently loads friction ring 20 and friction disc 23 to ensure a suitable dampening value also in the presence of oil. Plate 7 is subjected to a surface treatment to avoid wear which compromises alignment of pulley 4.

Friction disc 23 is fixed to rotation with respect to closing plate 25 and washer spring 24 is rotationally fixed with respect to friction disc 23 due to the friction generated with the disc itself by its own axial load. Friction disc 23 exerts a friction torque on eccentric arm 3 exclusively by means of the face in contact with head wall 22. In this manner, the friction torque is constant for the entire working life of the tensioner because the clearance due to wear are recovered by washer spring 24 and the friction surface is always the same.

Bearing 6 is sealed and contains a lubricating agent so that the lubrication is not affected by the amount of oil inside the engine compartment. Indeed, the amount of oil in the compartment depends on the type of application and may be poor where tensioner 1 is mounted.

Pin 28 is mounted on head wall 22 on axial part opposite to plate 7 so as not to define any restriction for the geometry of the torsion spring 5, which may present a wide radius to increase the actuating torque and for concurrently maintaining a relatively low stiffness. In this manner, it is possible to apply a high torque in essentially constant manner on the belt.

Polyamide 4.6 for friction ring 20 and friction disc 23 is adapted to ensure suitable dampening values and to withstand the aggression of combustible oil without causing excessive wear.

It is finally apparent that modifications and variations can be made to the tensioner 1 herein described and illustrated without because of this departing from the scope of protection of the accompanying claims.

It is possible to block the rotation of friction disc with respect to the arm and to mount the washer spring to load the friction disc and to be rotationally carried by the arm.

Furthermore, it is possible to use a polyamide 6.6 for friction ring 20 and friction disc 23.

The invention claimed is:

1. A tensioner comprising a base defining an axis (A), a mobile eccentric element hinged about said axis (A) and loaded by a first spring, a pulley for an oil wet belt drive idly connected to said mobile element, wherein said pulley defines a single body with the external ring of a rolling bearing mounted onto said mobile eccentric element, the mobile eccentric element including an annular groove radially disposed between axis (A) and an inner ring of the roller bearing, and said first spring is helical and presents a square or rectangular cross section turns and is housed in a cylindrical manner within the annular groove, and a protection bushing interposed between an inside surface of the first spring and the annular groove.

2. The tensioner according to claim 1, wherein said base comprises a pivot defining said axis (A) and having an outer layer hardened by means of a surface treatment and coupled to said mobile eccentric element.

3. The tensioner according to claim 2, wherein the hardness of said outer layer is higher than 600 HV.

4. The tensioner according to claim 3, wherein the hardening of the outer layer is obtained by a nickel-plating treatment.

5. The tensioner according to claim 1 wherein said roller bearing is fitted onto said mobile eccentric element and in that said bearing and said mobile eccentric element are made of steel.

6. The tensioner according to claim 1 said base comprises a plate having a hardened surface, a first friction element arranged between said mobile eccentric element and said plate and loaded by means of a second spring, and a second friction element loaded by means of said second spring.

7. The tensioner according to claim 6, wherein said second friction element is connected in a way that is rigid to rotation and slidable to translation to a constraint element carried by one of said base or said mobile eccentric element.

8. The tensioner according to claim 7, wherein said second spring is arranged between said constraint element and said second friction element.

9. The tensioner according to claim 8, wherein said second friction element is a disc comprising a plurality of projections which are oriented to be parallel to said axis (A) and slide in corresponding seats defined by said constraint element.

10. The tensioner according to claim 6 wherein at least one of said first and second friction elements comprises a polyamide.

11. The tensioner according to claim 6 further including a pin mounted onto the mobile eccentric element and a slot formed in a cover plate with the pin being arranged parallel to said axis (A) and radially external to the second friction element, wherein said pin and said slot cooperatively define two maximum angular positions for the rotation of said mobile eccentric element with respect to said base, said pin being positioned on said mobile eccentric element on an opposite axial side relative to said plate and said first friction element.

12. The tensioner according to claim 1 wherein said bearing is a sealed bearing containing a lubricating agent.

\* \* \* \* \*